US008135806B2

(12) United States Patent
Talayco et al.

(10) Patent No.: US 8,135,806 B2
(45) Date of Patent: Mar. 13, 2012

(54) VIRTUAL SYSTEM CONFIGURATION

(75) Inventors: Daniel Talayco, Mountain View, CA (US); Brian Baird, Pleasanton, CA (US); Allan Christie, Freemont, CA (US)

(73) Assignee: Broadcom Corporation, Irvine, CA (US)

( * ) Notice: Subject to any disclaimer, the term of this patent is extended or adjusted under 35 U.S.C. 154(b) by 598 days.

(21) Appl. No.: 11/429,288

(22) Filed: May 8, 2006

(65) Prior Publication Data

US 2006/0253557 A1 Nov. 9, 2006

Related U.S. Application Data

(60) Provisional application No. 60/678,216, filed on May 6, 2005.

(51) Int. Cl.
*H04L 12/26* (2006.01)
*H04J 1/16* (2006.01)
(52) U.S. Cl. .................. 709/220; 370/217; 370/236
(58) Field of Classification Search .............. 709/220, 709/228; 714/4, 10, 13; 712/28–31
See application file for complete search history.

(56) References Cited

U.S. PATENT DOCUMENTS

| 4,644,532 | A | * | 2/1987 | George et al. | 370/255 |
|---|---|---|---|---|---|
| 5,664,214 | A | * | 9/1997 | Taylor et al. | 712/20 |
| 5,968,185 | A | * | 10/1999 | Bressoud et al. | 714/10 |
| 6,061,750 | A | * | 5/2000 | Beardsley et al. | 710/74 |
| 6,151,684 | A | * | 11/2000 | Alexander et al. | 714/4 |
| 6,219,705 | B1 | * | 4/2001 | Steinberger et al. | 709/224 |
| 6,308,328 | B1 | * | 10/2001 | Bowcutt et al. | 725/111 |
| 6,539,540 | B1 | * | 3/2003 | Noy et al. | 717/141 |
| 6,587,125 | B1 | * | 7/2003 | Paroz | 715/740 |
| 6,950,855 | B2 | * | 9/2005 | Sampathkumar | 709/209 |
| 7,047,289 | B1 | * | 5/2006 | Gopal | 709/223 |
| 7,447,149 | B1 | * | 11/2008 | Beesley et al. | 370/217 |
| 7,483,370 | B1 | * | 1/2009 | Dayal et al. | 370/219 |
| 7,593,320 | B1 | * | 9/2009 | Cohen et al. | 370/217 |
| 2001/0028656 | A1 | * | 10/2001 | Fukunaga | 370/402 |
| 2002/0026550 | A1 | * | 2/2002 | Suzuki et al. | 710/104 |
| 2002/0032761 | A1 | * | 3/2002 | Aoyagi et al. | 709/223 |
| 2002/0035626 | A1 | * | 3/2002 | Higuchi | 709/223 |
| 2002/0046271 | A1 | * | 4/2002 | Huang | 709/223 |
| 2003/0208574 | A1 | * | 11/2003 | Chen et al. | 709/223 |
| 2004/0141463 | A1 | * | 7/2004 | Acharya et al. | 370/238 |
| 2005/0010580 | A1 | * | 1/2005 | Lancefield | 707/100 |
| 2005/0099948 | A1 | * | 5/2005 | Wakumoto et al. | 370/236 |
| 2005/0132044 | A1 | * | 6/2005 | Guingo et al. | 709/225 |
| 2005/0165834 | A1 | * | 7/2005 | Nadeau et al. | 707/103 R |
| 2005/0169258 | A1 | * | 8/2005 | Millet et al. | 370/389 |
| 2005/0276215 | A1 | * | 12/2005 | Kitani et al. | 370/217 |
| 2006/0092978 | A1 | * | 5/2006 | John et al. | 370/473 |
| 2006/0143350 | A1 | * | 6/2006 | Miloushev et al. | 710/242 |

* cited by examiner

*Primary Examiner* — Ian N Moore
*Assistant Examiner* — Thai Nguyen

(57) ABSTRACT

A method, system and apparatus for decoupling devices in a network for use by a system-wide application. The invention includes accumulating configuration information for the network, wherein the network includes a plurality of units, and each of the units includes a processor and at least one switch device. The invention further includes analyzing the configuration information and determining a logical configuration for the network based on the analyzed configuration information. The invention further includes virtually attaching a remote switch device to the network.

17 Claims, 7 Drawing Sheets

VIRTUAL SYSTEM CONFIGURATION

CROSS-REFERENCE TO RELATED APPLICATIONS

This application claims priority of U.S. Provisional Patent Application No. 60/678,216, filed on May 6, 2005. The subject matter of this earlier filed application is hereby incorporated by reference.

BACKGROUND OF THE INVENTION

1. Field of the Invention:
The invention relates to configuration of multiple network devices.

2. Description of the Related Art:
As computer performance has increased in recent years, the demands on computer networks has significantly increased; faster computers processors and higher memory capabilities need networks with high bandwidth capabilities to enable high speed transfer of significant amounts of data. The well known Ethernet technology, which is one example of computer networking technology which has been able to be modified and improved to remain a viable computing technology.

Based upon the Open System Interconnect (OSI) 7-layer reference model, network capabilities have grown through the development of repeaters, bridges, routers and switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which media access controller (MAC) address exist on which ports of the bridge, and pass packets that are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In addition, there has also been pressure from the implementers of the computer networks to have network devices to mediate traffic on the computer networks that are flexible and are able to provide the needed capacity through the combination of multiple network devices. For example, a network device having eight ports may be linked with one or more similar network devices to provide the capacity of the multiple ports of the linked devices. While the combination of multiple network devices may be ideal in meeting capacity requirements, the combination of the network devices also results in other issues. One such issue is that each network device has its own means for determining the destination port for a received datagram and those means must be synchronized to provide efficient operation. While the prior art network devices and methods provide many of these attributes, there is a need for network devices that may be used together to provide the capacity needed by the implementers and provide efficiency in handling of datagrams.

Today's network switching products often require high port density, centralized management, redundancy, modularity and many other features. Providing these features requires flexible, distributed approaches coordinating multiple CPUs, which support components that may be added or removed dynamically.

There are different methods in the art to provide upgrades among different product lines and to provide multi-product support for these products. The problems associated with providing upgrades and related support is that each of the products or different versions of the products require different arguments.

DETAILED DESCRIPTION OF THE PREFERRED EMBODIMENT(S)

Stackable and chassis-based software products reflect two approaches to address the requirements discussed above. Building these systems involves solving many complex issues.

Stacking is a method of connecting two or more physical switch devices to build a larger system that behaves as a single logical entity. For example, for some devices, this means connecting devices together using Gigabit ports configured in a stacked mode. In other examples, stacking is accomplished over various links such as a Gigabit link.

In these examples, the hardware attaches information to each packet traversing a stack link. This allows the switch device functions to work properly across multiple devices. For example, link aggregation requires that information be passed with the packet to provide load balancing across the trunked ports. The goal of stacking is to eliminate the need for applications to be aware of these details.

Figure 1:
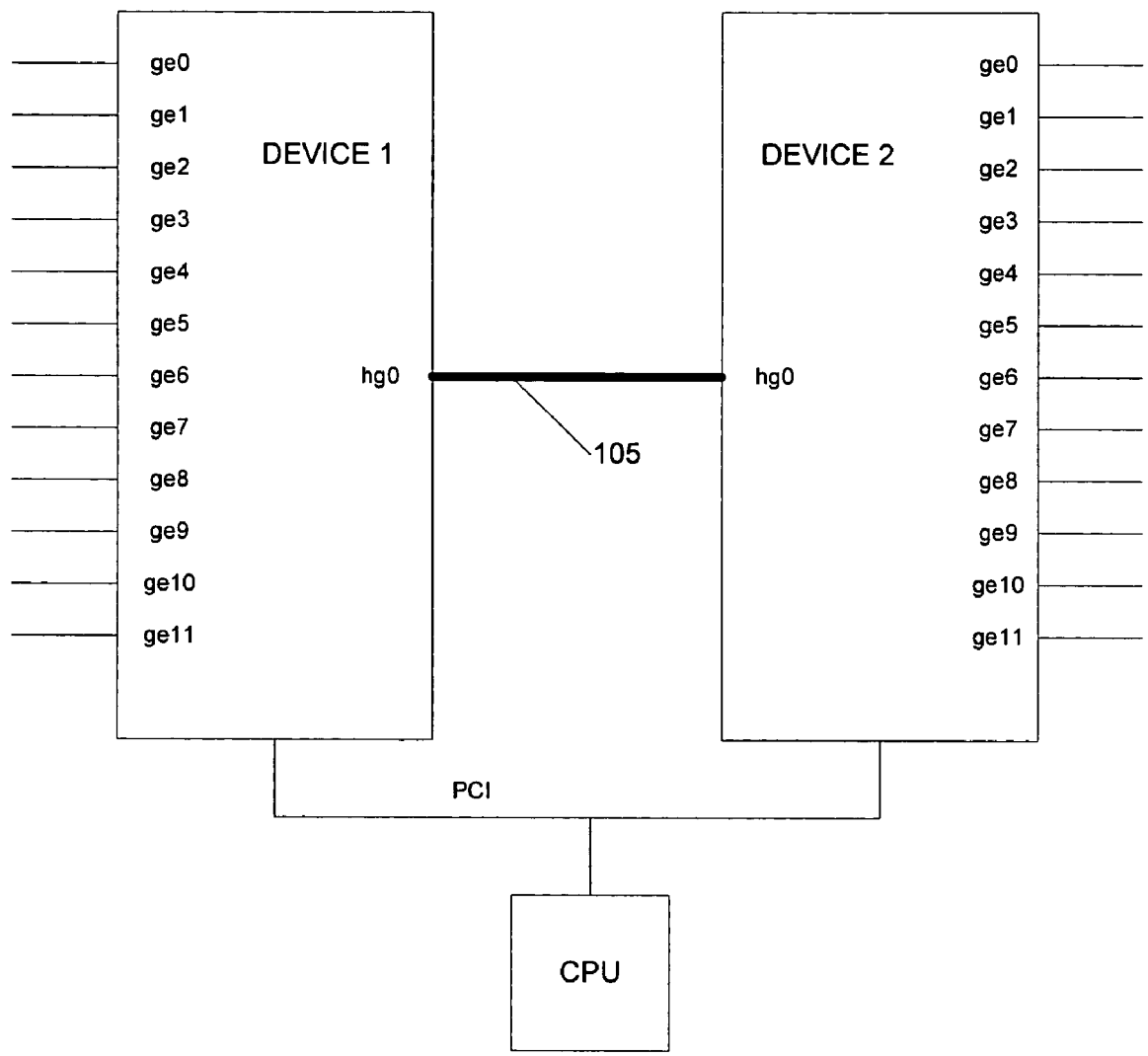
FIG. 1 illustrates an example of a device configuration.

When multiple devices exist in a system, tasks such as creating a virtual local area network (VLAN) may require the programming of all of these devices. FIG. 1 illustrates an example of a device configuration. In this example, the two devices Device 1 and Device 2 are connected back to back by a link 105 such as a PCI bus. In this example, only one CPU is used to manage this configuration. The use of an API to control these devices is relatively straight forward, as the two devices Device 1 and Device 2 are recognized on the PCI bus 105 and programmed directly by the CPU. In such a configuration, there are programming requirements to ensure that the two chips act as one.

For example, to create a VLAN that includes all 24 Gigabit ports, each device must be programmed to create the VLAN, add all 12 GE ports to the VLAN, as well as add the links to the VLAN. An appropriate API is needed in order to enable rapid and accurate development on configurations with multiple devices.

A more complex form of stacking involves multiple CPUs where multiple independent switches that are connected together act as one logical switch. For example, a 48-port switch with its own CPU subsystem and local configuration may be connected to another such unit.

Figure 2:
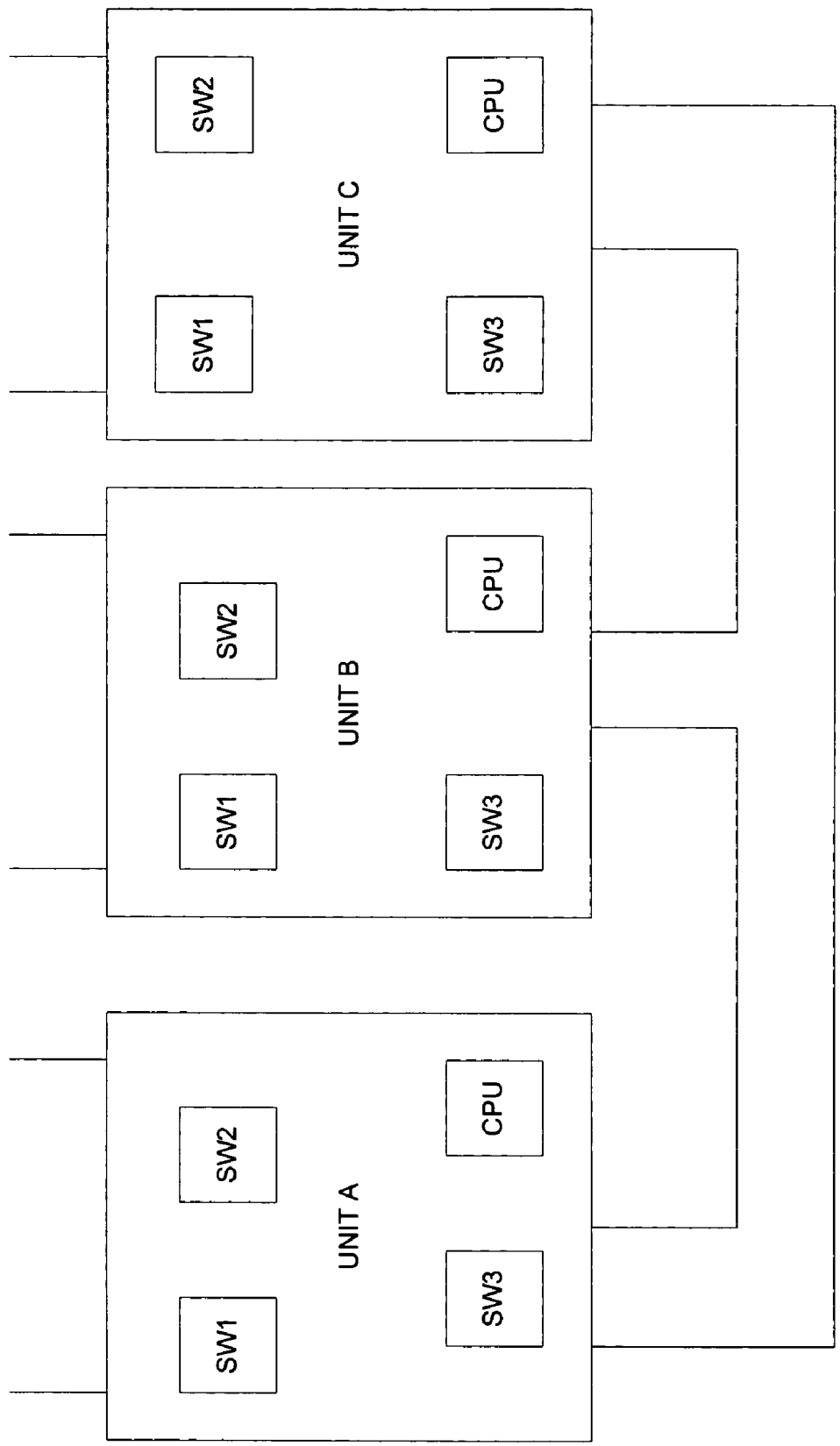
FIG. 2 represents an exemplary configuration of a communications system of stacked network devices.

FIG. 2 represents an exemplary configuration of a communications system of stacked network devices. In FIG. 2, three units Unit A, Unit B and Unit C are stacked, or connected together to provide the scalability discussed above. The network devices send and/or receive data across dedicated connections referred to as "stack ports." Note that each unit may include multiple switch devices SW1, SW2 and SW3. According to this configuration, each device within the system is controlled by a CPU that programs the local circuitry, as well as, coordinates with CPUs in other units. The stacked network devices perform as a single logical network switch with a larger load capacity. Network devices may be network hardware components capable of generating, receiving and processing packets. The network devices may have switching and/or routing capabilities that are utilized in a local area network (LAN) or other communications networks or systems. As shown in the example illustrated in FIG. 2, each of the network devices may include a processor (CPU) or CPU functionality, be in communication with a CPU or connected to an external CPU.

Figure 3:
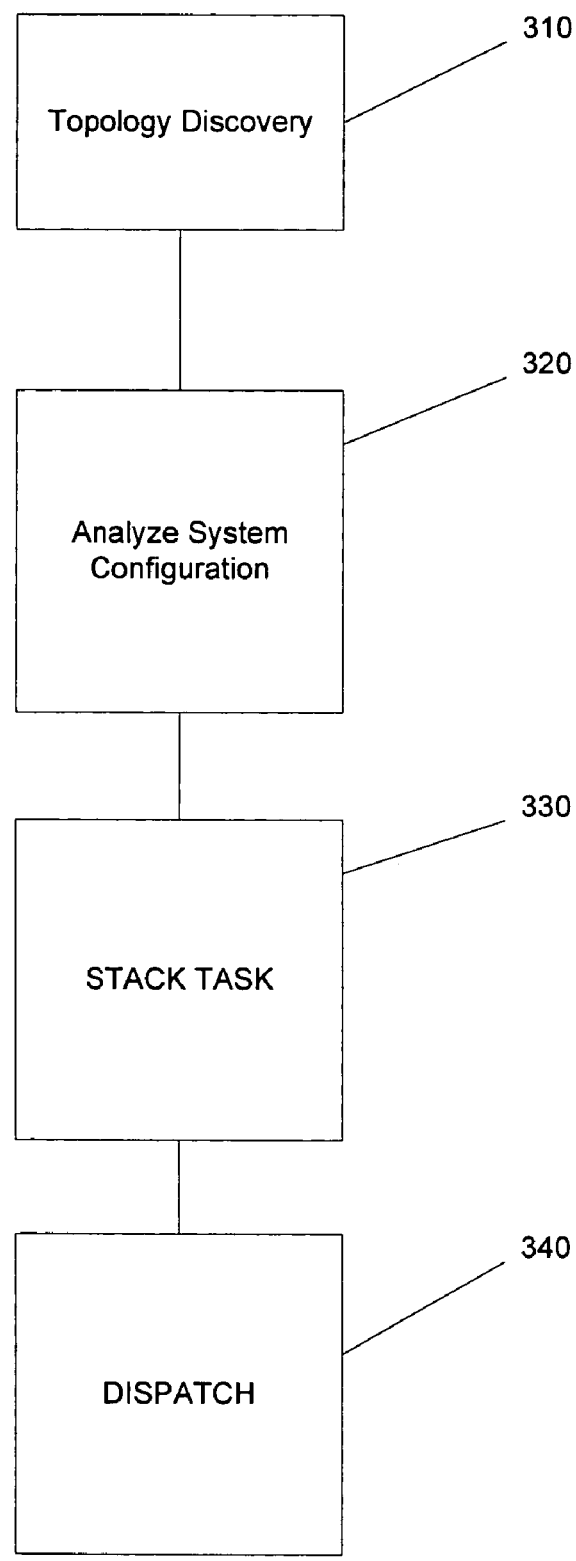
FIG. 3 is an exemplary embodiment of the invention.

An exemplary embodiment of the invention is a method for decoupling remote devices in a communications system in a manner that is transparent to the application. As a result the application sees a virtual system configuration. The method determines and analyzes the system configuration and either adds or removes remote system devices and provides a virtual system configuration by decoupling some network devices. This embodiment is illustrated in FIG. 3 which is discussed below.

Figure 4A:
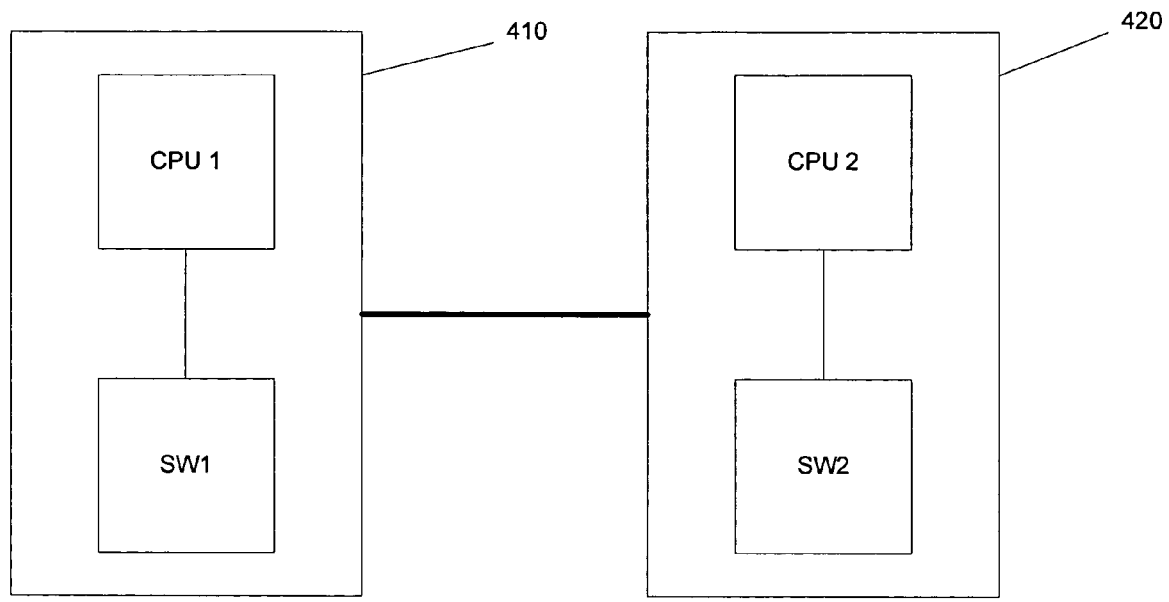
FIGS. 4A and 4B, further illustrates the example embodiment of the present invention.
Figure 4B:
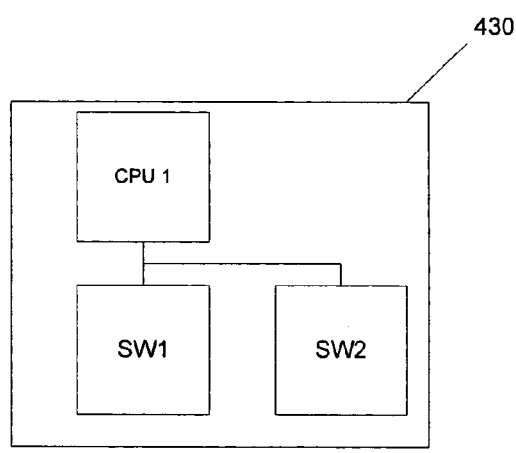

FIGS. 4A and 4B, further illustrates the example embodiment of the present invention. FIG. 4A illustrates Unit A 410 and Unit B 420 physical connections. In this example, Unit A 410 includes a processor, CPU 1 and a switch SW1. Unit B 420 includes a processor CPU 2 and a switch SW2. If Units A 410 and B 420 are to be stacked as discussed above, an application would have to implemented locally on each of Unit A 410 and Unit B 420, through their respective CPUs. In other words, CPU 1 would have to program SW1 and CPU 2 would have to program SW2. However, as discussed above, one of the goals of the stacked configuration is to perform as a single device.

FIG. 4B illustrates the system shown in FIG. 4A in virtual form, with CPU 2 "decoupled" from the system such that it appears to an application running on CPU 1 that SW2 is controlled by CPU1. The method of decoupling CPU 2 is described below.

As discussed above, a plurality of stacked network groups form a system. As shown in FIG. 3 the first part of the method according to the present invention is topology discovery 310. The topology of the system can be discovered either manually or automatically. The discovery process provides a reference implementation for determining the system configuration. The process exchanges CPU database information using a communications protocol. The discovery process supports timeouts and detects completion of the discovery process. The discovery process does not configure any of the devices and be run either before or after configuration for normal switching and does not interfere with normal switching. Thus the process can respond to system events without disrupting normal packet flow.

Figure 5A:
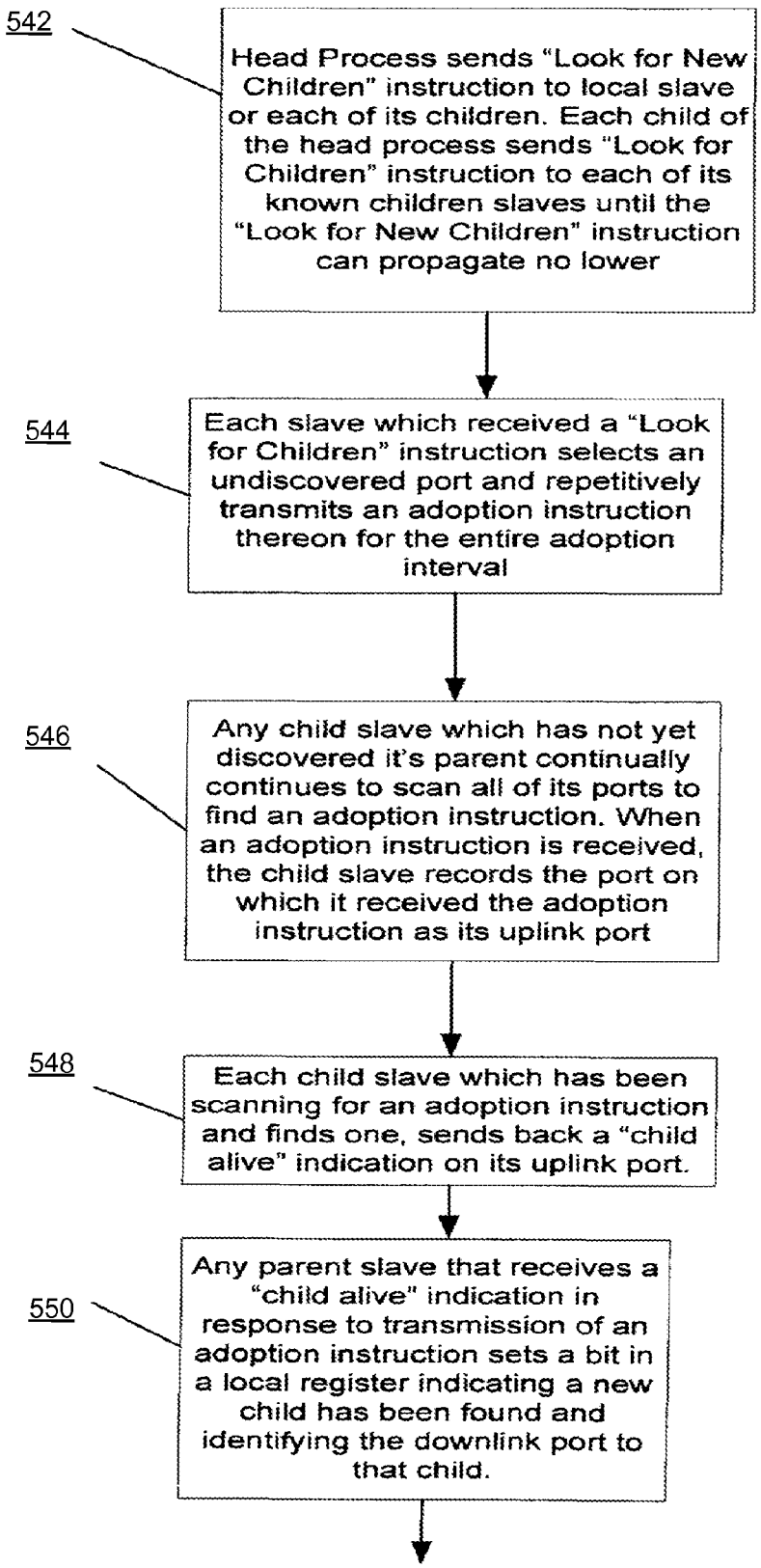
FIGS. 5A and 5B illustrates an example of the probe phase according to an embodiment of the invention.
Figure 5B:
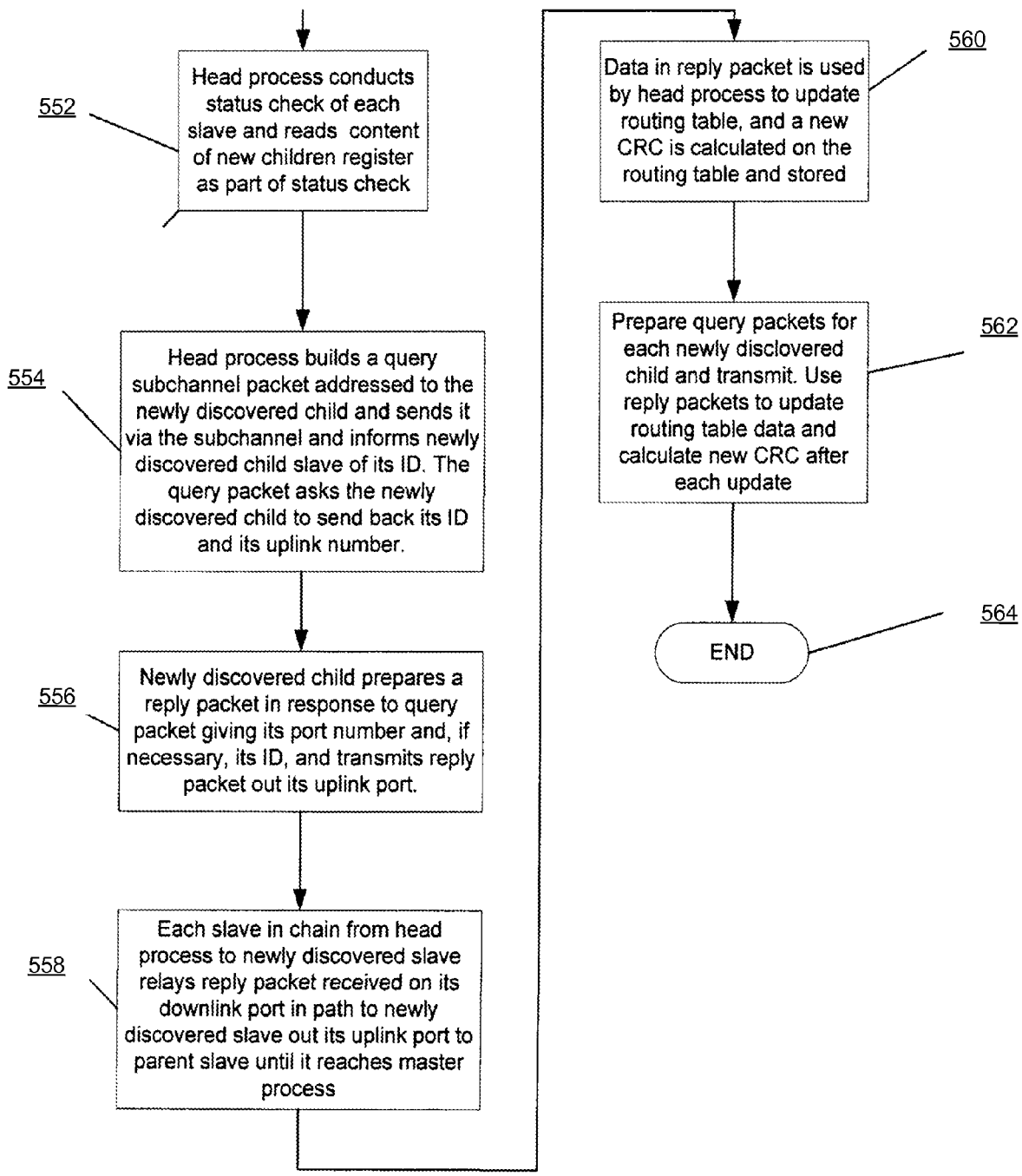

When multiple CPU systems are connected together, the configuration of the system must be determined. This is accomplished either statically or by an automated process. The discovery process operates in three phases; probe, routing and configuration. The probe phase determines remote connections of stack ports. The probe phase determines which CPU lies on the transmit (TX) and receive (RX) connections of each stack port. The probe packets maintain source routing information and are processed when they return to their originator. If a CPU receives a probe packet and it is not the originator of the packet, it adds its own information into the packet, including TX and RX stack port information, and forwards the packet out all stack ports. An example of the probe phase is described below in light of FIGS. 5A and 5B.

When the routine is called, processing begins at step 542 wherein a head process sends a Look call to each of its children or slaves. Each child slave forwards the inquiry to each of its known children, and the process continues until the inquiry can propagate no lower in the hierarchy.

Each slave device that receives the inquiry reacts in the same way to begin searching for new children slaves on any ports remaining in the slave which do not have known children attached thereto. Only one "undiscovered" port (meaning no known child attached thereto) is used for interrogation during each timeslot in each slave. In other words if a first slave device has two known children and two undiscovered ports, and a second slave device has no known children and 3 undiscovered ports, during the topology discovery process, each of the first and second slaves are going to interrogate only one of their undiscovered ports with only a single multiplexer. Interrogation of one of the undiscovered ports is accomplished by repetitively transmitting an adoption instruction out the selected undiscovered port using the subchannel transmitter for the entire adoption period, i.e., an entire timeslot devoted to topology discovery. The adoption instruction basically indicates to any child that receives it, its ID and indication that it will be the child's parent. This process of interrogating one undiscovered port for a new child is shown by block 544.

Any child slave which has not yet found its parent will be scanning all of its ports at a high rate to find such an adoption instruction. When it receives an adoption instruction, the new child slave records the port number it received it on as its uplink port in its configuration data, as shown by block 546.

Next, any child slave which has newly discovered its parent sends back a "child alive" indication on its uplink port, as shown by block 548. The "child alive" indication is the same for every child slave and contains no information specific to that child slave such as its ID or it could contain the port number of the slave's uplink port.

Any slave which receives a "child alive" indication in response to the transmission of an adoption instruction responds by setting a bit in a register therein. This bit indicates that a new child has been found and indicates on which downlink port it was found, as illustrated by block 550.

On a subsequent call of the topology discovery subroutine, the head process conducts a status check of each slave and gather status information from each slave. Part of this status information is the content of the "new children" register which has the bit set in it indicating a new child has been found, as illustrated in block 552. This status check can take any form such as a poll of all known children by sending a query packet to each one using appropriate routing instructions from the routing table and requesting that the contents of the register be sent back to the head process.

The content of the new children register of any slave which has found new children is used to update the topology data stored by the head process. Since the position of the bit in the "new children" register indicates the downlink port number, the head process has all the information it needs to build a query packet to the newly discovered child, and this is done either on the same pass through the subroutine or on a subsequent pass. The process of building the subchannel query packet addressed to the newly discovered child using routing data gleaned from the data obtained from the status check of the parent that discovered the new child and sending it via the subchannel is represented by block 554. The query packet informs the newly discovered child slave of what ID has been assigned to it. The routing fields are the same as explained elsewhere herein. This query packet asks the slave to send back its ID and its uplink port number in embodiments where the ID of every slave is fixed or just its uplink port number where the ID has been assigned although if multiple new child slaves have been discovered, the reply packets should each include the ID even if the master node assigned it to each child slave so that replies from different slaves can be kept straight. In the preferred embodiment, the ID is assigned by the head process and the new slave is informed of its ID in the query packet.

The newly discovered child receives this query packet and responds by generating an upstream packet which contains its uplink port number and, if necessary, its ID, as symbolized by block 556. This upstream packet needs no routing instructions since all slaves in the chain from the head to it still have their multiplexers tuned to the downlink ports used to relay the query packet to the newly discovered slave and will remain tuned to that port until the reply packet has been received and relayed out the uplink port to the parent slaves all the way up to the head process, as represented by block 558. This aspect of the process works the same as subchannel transmissions of packets to process NMS get and set operations.

The uplink port number or ID in the reply packet are used by the head process to update the routing table, and then a new CRC is calculated on the routing table and stored, as symbolized by block 560.

The process of preparing query packets for any other newly discovered children and sending them and receiving the reply packets and updating the routing table and calculating a new CRC upon each update is symbolized by block 562. That ends the automatic topology discovery process. If any part of the system configuration is changed the discovery tasks must be destroyed.

The routing phase conveys information to neighbors with the effect of distributing all connectivity information to every CPU in the system. The routing phase allows the exchange of remote information between CPUs within the system. Routing packets are sent to immediate neighbors, but every entry in the local database is passed on. Thus remote information propagates through the system.

Once the TX and RX connections are known for all local stack ports, a flag is set indicating that the process is complete. This information is conveyed in the routing packets.

In another exemplary embodiment of the invention one of the network switches is elected as a central authority referred to as a master. A master priority entry may be includes in each database. The master may be elected by comparing he master priority entries of each switch. The switch which has the highest master priority entry will be elected as a master. In the case that more than one switch has the highest priority, the local CPU with the lowest identifier is designated as the master.

Once the master CPU recognizes itself as the master, it sends out configuration packets to the remaining CPUs in the system which is phase three of the discovery process. Each CPU in turn, sends a configuration packet back to the master as confirmation. At this time discovery is complete on the remote units.

Referring again to FIG. 3 after the system is discovered the system is analyzed 320. The analysis provides a reference implementation for determining an operational configuration for the system. The analysis process examines the connections detected by the discovery process, determines the shortest path between systems and indicates which stack ports should be enabled for certain connections. A purpose of the analysis is to allow all ports to communicate to one another, avoid the creation of loops, and provide features such as shortest path routing or load balancing between subsystems.

The master controls the analysis of the configuration information in a database. The master may undertake the analysis through, for example, graph analysis, loop detection or path determination. The master sends the results of the analysis, in topology packets to all of the network switches in the stack. The topology packet contains the final configuration information that all of the switches have resolved to use and signals the end of the discovery process.

One piece of information gathered during the analysis is the route by which packets should go from one point in the system to another. To relay information to the other CPUs in the system, an index based on the CPU database. Connections are referenced by the stack port indexes that appear in the CPU database.

During the analysis, it is assumed that routing within a subsystem is managed by the local CPU. In particular, given a specific port controlled by a CPU and a stack port on that same unit or subsystem, the routing between those ports is determined from the local configuration information. Thus, the topology description only needs to indicate the interconnections between different units or subsystems.

Once a configuration is determined that will allow the system to operate normally, the information is used to program the system devices.

Referring again to FIG. 3 the method or system next performs a "stack task" 330. The stack task 330 registers with appropriate API calls to detect events such as link change and discovery packet arrival. The stack task 330 also manages discovery and topology analysis and provides the necessary information for notification of system configuration events such as attaching and detaching devices to other application layers. There are several events which cause the stack task to start. These events include, but are not limited to, stack port link state changes, command requests, fatal communication losses or receipt of a stack configuration frame on a stack port.

Before performing the stack task 330, each unit of the system provides static information including, but not limited to, which ports are stack ports, a unique key such as a MAC address or serial number, master selection priority and in some cases a slot number if the unit is located in a chassis. This information is obtained during the discovery process discussed above. The static information is read for the unit if the unit is possibly going to join the system.

The next step of the method is called dispatch 340. Dispatch allows devices to be attached either locally or remotely. For local devices function calls are processed on the local CPU. For devices that are attached to remote CPUs, a remote procedure call (RPC) driver is installed. An RPC is a protocol that one program can use to request a service from a program located in another computer in a network without having to understand network details. RPC uses the client/server model. The requesting program is a client and the service-providing program is the server. Like a regular or local procedure call, an RPC is a synchronous operation requiring the requesting program to be suspended until the results of the remote procedure are returned.

The dispatch effectively makes a remote device such as a switch chip, appear and function as a local switch chip to system-wide applications because the remote CPU has been decoupled from the point of view of the application.

Figure 6:
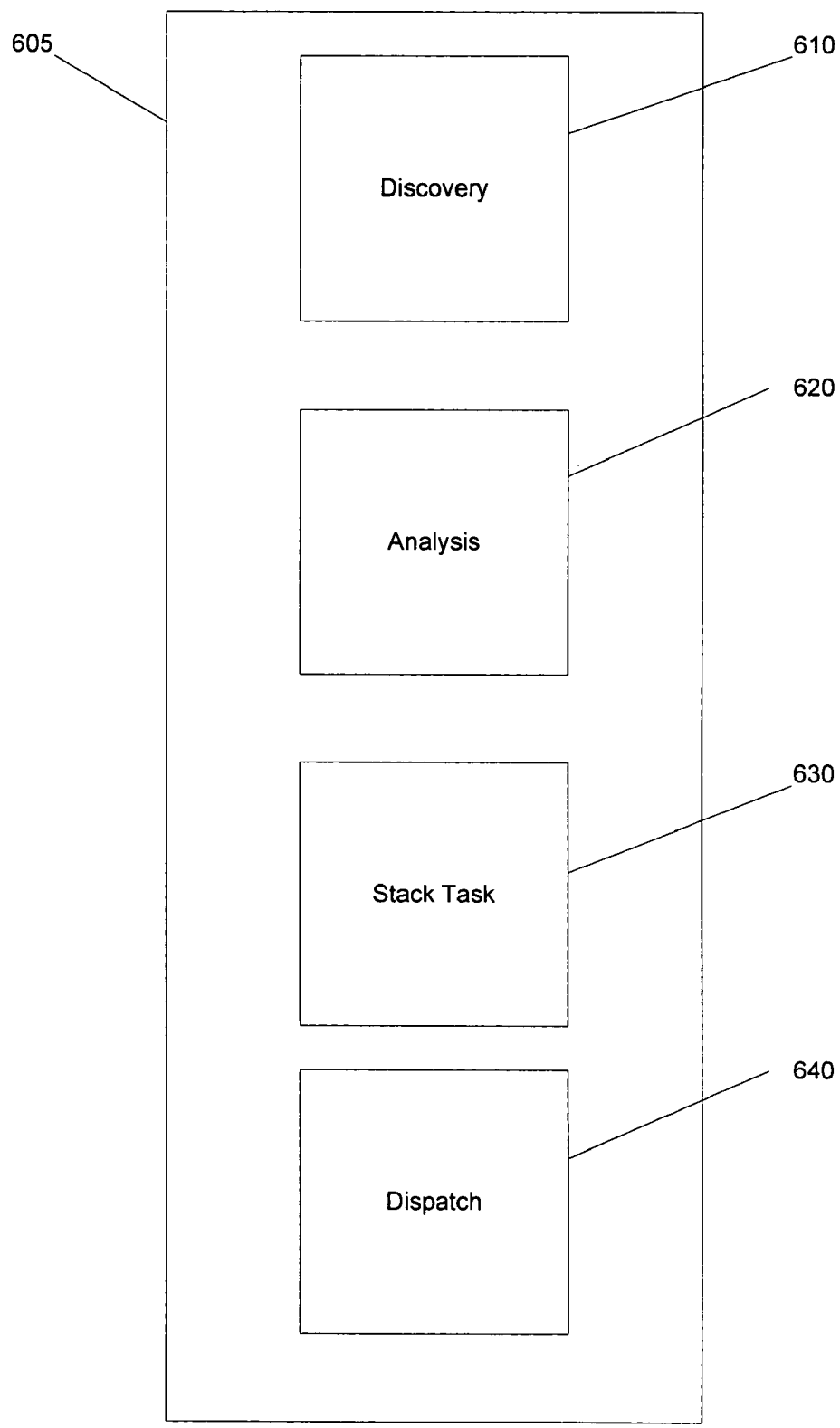
FIG. 6 illustrates another exemplary embodiment of the present invention.

FIG. 6 illustrates another exemplary embodiment of the present invention. The system 605 is an example system for decoupling devices in a network. The discovery unit 610 performs the topology discovery for the network as discussed above. This is accomplished either statically or by an automated process. The discovery process operates in three phases; probe, routing and configuration.

The next unit of the system 605 is the analysis unit 620. The function of the analysis unit 620 is discussed in detail above. The analysis provides a reference implementation for determining an operational configuration for the system. The analysis process examines the connections detected by the discovery process, determines the shortest path between systems and indicates which stack ports should be enabled for certain connections. A purpose of the analysis is to allow all ports to communicate to one another, avoid the creation of loops, and provide features such as shortest path routing or load balancing between subsystems.

Another unit of system 605 is the stack task unit 630. The function of the stack task unit 630 is discussed in detail above. The stack task unit 630 registers with appropriate API calls to detect events such as link change and discovery packet arrival. The stack task 330 also manages discovery and topology analysis and provides the necessary information for notification of system configuration events such as attaching and detaching devices to other application layers. There are several events which cause the stack task to start. These events include, but are not limited to, stack port link state changes, command requests, fatal communication losses or receipt of a stack configuration frame on a stack port.

Another unit of system 605 is the dispatch unit 640. The function of the dispatch unit 640 is discussed in detail above. Dispatch allows devices to be attached either locally or remotely. For local devices function calls are processed on the local CPU. For devices that are attached to remote CPUs, a remote procedure call (RPC) driver is installed by the dispatch unit 640. An RPC is a protocol that one program can use to request a service from a program located in another computer in a network without having to understand network details. RPC uses the client/server model. The requesting program is a client and the service-providing program is the server. Like a regular or local procedure call, an RPC is a synchronous operation requiring the requesting program to be suspended until the results of the remote procedure are returned.

One having ordinary skill in the art will readily understand that the invention as discussed above may be practiced with steps in a different order, and/or with hardware elements in configurations which are different than those which are disclosed. For example, the present invention may be implemented at least as a computer product including computer-readable code, a chip set or ASIC, or a processor configured to implement the method or system. Additionally, the invention may be implemented as a protocol to support decoupling of network devices. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method for decoupling devices in a network for use by a system-wide application, the method comprising:
   accumulating topology information for the network, the topology information including parent and child connection information between two or more stacked units of the network and including transmit and receive connections for each stack port, wherein each of the stacked units includes a processor and at least one switch device;
   analyzing the topology information using the transmit and receive connections for each stack port to enable communications between the stack ports and to determine packet routing between the stacked units;
   distributing the topology information for the network based on the analyzed topology information to each of the stacked units; and
   virtually attaching a remote switch device to the network by decoupling a processor of the remote switch device such that the remote switch device is virtually controlled by a processor of a different stacked unit and the remote switch device appears and functions as a local switch device to system-wide applications, wherein the decoupled processor of the remote switch device functions as a local central processing unit to process local device functions, wherein virtually attaching the remote switch device comprises using a remote procedure call (RPC) to virtually attach devices that are in remaining units of the network.

2. The method of claim 1 wherein accumulating topology information includes electing a master processor for the network, wherein the master processor is located in a first unit of the plurality of units.

3. The method of claim 1, wherein accumulating topology information for the network includes transmitting probe packets, the probe packets including routing information as added by one or more of the stacked units.

4. A system for decoupling devices in a network, the system comprising:
   a processor further comprising:
      a discovery unit that discovers a topology of the network, the topology including parent and child connection information between two or more stacked units of the network and including transmit and receive connections for each stack port;
      an analysis unit that analyzes the topology of the network using the transmit and receive connections for each stack port to enable communications between the stack ports and to determine packet routing between the stacked units and;
      a stack task unit that distributes topology information for the network based on the analyzed topology information to each of the stacked units;
      a dispatch unit that virtually attaches a remote switch device to the network by decoupling a processor of the remote switch device such that the remote switch device is virtually controlled by a processor of a different stacked unit and the remote switch device appears and functions as a local switch device to system-wide applications, wherein the decoupled processor of the remote switch device functions as a local central processing unit to process local device functions, wherein the dispatch unit virtually attaches the remote switch device to the network using a remote procedure call (RPC).

5. The system of claim 4, wherein the discovery unit elects a master processor for the network, wherein the master processor is configured to receive a packet back from the stacked units confirming the topology.

6. The system of claim 4, wherein the discovery unit utilizes probe packets, the probe packets including routing information as added by one or more of the stacked units.

7. An apparatus for decoupling devices in a network for use by a system-wide application, the apparatus comprising:

a processor further comprising:

means for accumulating topology information for the network, the topology information including parent and child connection information between two or more stacked units of the network and including transmit and receive connections for each stack port, wherein each of the stacked units includes a processor and at least one switch device;

means for analyzing the topology information using the transmit and receive connections for each stack port to enable communications between the stack ports and to determine packet routing between the stacked units and;

means for distributing the topology information for the network based on the analyzed topology information to each of the stacked units;

means for virtually attaching a remote switch device to the network by decoupling a processor of the remote switch device such that the remote switch device is virtually controlled by a processor of a different stacked unit and the remote switch device appears and functions as a local switch device to system-wide applications, wherein the decoupled processor of the remote switch device functions as a local central processing unit to process local device functions, wherein the means for virtually attaching the remote switch device comprises means for virtually attaching the remote switch device to the network using a remote procedure call (RPC).

8. The apparatus of claim 7, wherein the means for accumulating topology information further comprises means for electing a master processor for the network.

9. The apparatus of claim 7, wherein the means for accumulating topology information comprises means for utilizing probe packets to accumulate the topology information, the probe packets including routing information as added by one or more of the stacked units.

10. The method of claim 1, wherein the accumulating topology information comprises determining remote connections between the stacked units.

11. The method of claim 1, wherein the analyzing the topology information comprises determining a shortest path between a first stacked unit and a second stacked unit in the network.

12. The method of claim 2, wherein the distributing the topology information is performed by the master processor.

13. The system of claim 4, wherein the discovery unit is configured to determine remote connections between the stacked ports of the units.

14. The system of claim 4, wherein the analysis unit is configured to determine the logical topology, including a shortest path routing between two or more of the stacked units, as determined based on the topology.

15. The system of claim 4, wherein the analysis unit is configured to determine which stack ports of the stacked units should be enabled to allow the stacked units to communicate with one another without a creation of loops.

16. The apparatus of claim 7, wherein the means for analyzing is configured to determine which stack ports of the stacked units should be enabled to allow the stacked units to communicate with one another without a creation of loops based on a shortest path routing between the stacked units.

17. The apparatus of claim 9, wherein the probe packets that are received by a stacked port with one or more children, are distributed by that parent to its one or more children.

* * * * *

UNITED STATES PATENT AND TRADEMARK OFFICE
CERTIFICATE OF CORRECTION

| | |
|---|---|
| PATENT NO. | : 8,135,806 B2 |
| APPLICATION NO. | : 11/429288 |
| DATED | : March 13, 2012 |
| INVENTOR(S) | : Daniel Talayco et al. |

Page 1 of 1

It is certified that error appears in the above-identified patent and that said Letters Patent is hereby corrected as shown below:

In column 8, line 61, in claim 4, delete "units and;" and insert -- units; and --, therefor.

In column 9, line 30-31, in claim 7, delete "units and;" and insert -- units; and --, therefor.

Signed and Sealed this
Twenty-ninth Day of May, 2012

David J. Kappos
*Director of the United States Patent and Trademark Office*